United States Patent Office 3,422,798
Patented Jan. 21, 1969

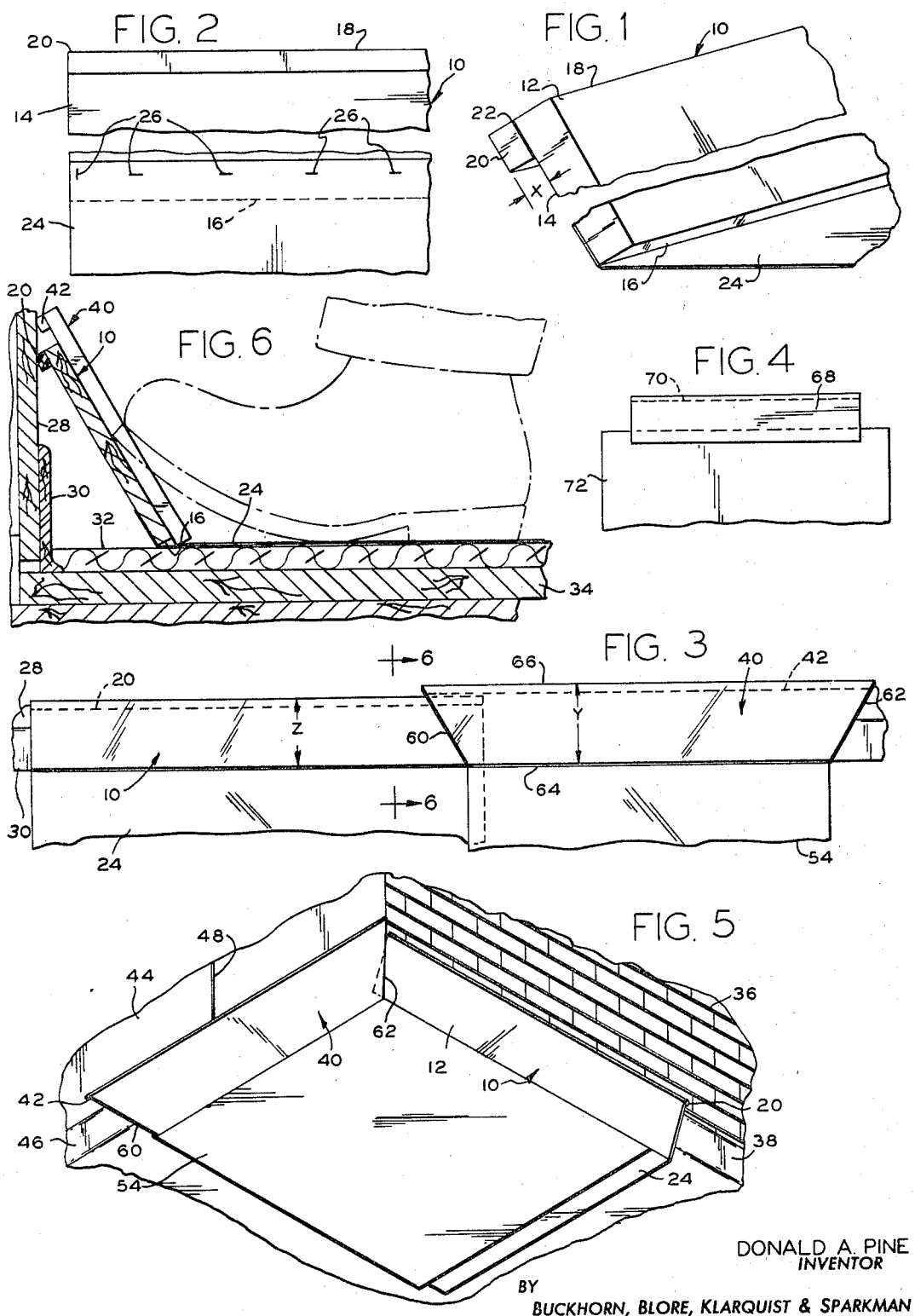

3,422,798
BASEBOARD PROTECTING SHIELD
Donald A. Pine, 3525 SE. 9th Ave.,
Portland, Oreg. 97202
Filed Mar. 21, 1968, Ser. No. 714,928
U.S. Cl. 118—504      10 Claims
Int. Cl. B05b 15/04

ABSTRACT OF THE DISCLOSURE

A shield for protecting a baseboard from paint or similar substances applied to a wall thereabove comprises an elongated member having front and rear sides defined between parallel lateral edges. A first edge is adapted to rest upon a horizontal floor surface for supporting the elongated member in angular relation against a wall. The member includes a resilient bumper means disposed along the rear side of the member adjacent a second parallel edge thereof for engaging the wall surface. The weight of the member leaning against the wall compresses the resilient bumper means causing the bumper means to conform to irregularities of the wall for substantially forming a seal between the bumper means and the wall. The elongated member provides a cover for a baseboard functioning to protect the baseboard from liquid or semiliquid material applied to the wall thereabove.

Background of the invention

In painting wall surfaces, or in applying other liquid or semiliquid material thereto, it is usually desirable to avoid dripping of the liquid on the baseboard at the foot of the wall, or upon the floor or floor covering adjacent the basebard. If paint or other liquid falls on portions of a baseboard or floor covering, either in drops or in a fine mist, it must be then cleaned therefrom. Many baseboards are very difficult to clean, for example in the case of natural wood baseboard or rubber strip. Some form of masking device or masking tape may be semipermanently aittached to the baseboard. However, the application and use of conventional masking expedients tends to be very cumbersome and time consuming.

Summary of the invention

According to the present invention, a baseboard shield includes a rigid, elongated member which is preferably flat, having front and rear sides defined between parallel lateral edges. A first lateral edge is adapted to rest on a horizontal floor surface or floor covering for supporting the elongated member in angular relation relative to a wall for covering the baseboard. The elongated member is provided with a soft, resilient bumper means disposed along the rear side of the elongated member adjacent the second edge thereof. This bumper means engages the wall, and the weight of the member compresses the resilient bumper means against the wall for causing the edge of the bumper means to conform to wall irregularities. The elongated member thereby forms a sealed cover for the wall baseboard, protecting the baseboard from liquid or semiliquid material applied to the wall thereabove. When a liquid or semiliquid material such as paint is applied to the wall and this material drops on the edge of the aforementioned bumper means, the bumper means does not lose its resilient properties. Paint, or the like, will not permanently coat the resilient bumper means and cause the bumper means to become hard and brittle, but instead the paint dries and flakes off of the bumper means as a powder as a result of flexure of the bumper means. The bumper means then retains its resilient qualities for conforming to the wall irregularities, from one use thereof to the next.

The shield is also preferably provided with a skirt or drop cloth which is desirably attached to the elongated member on the side thereof adjacent the wall and the aforementioned bumper means. This cloth in use extends under the first edge of the elongated member and covers and protects the floor from paint spatter. The skirt, together with the bumper means, frictionally engages the floor and wall respectively, whereby the elongated member has little tendency to shift in position.

It is accordingly an object of the present invention to provide an improved shield for protecting baseboards from paint or a similar substance applied to a wall surface thereabove.

It is another object of the present invention to provide an improved baseboard shield capable of conforming to the wall irregularities, whereby paint or a similar substance has little tendency to run behind the shield.

It is a further object of the present invention to provide an improved baseboard shield adapted to form a seal with the wall over a protected baseboard, and which retains its sealing properties from one usage thereof to the next.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

Drawings

FIG. 1 is a perspective view of a baseboard shield according to the present invention;

FIG. 2 is an elevational rear view of the same shield;

FIG. 3 is an elevational view of a shield means comprising a pair of individual shields employed in end-to-end relation;

FIG. 4 is a plan view of another baseboard shield according to the present invention for completing a set with the shields illustrated in FIG. 3;

FIG. 5 is a perspective view of a pair of individual baseboard shields employed to shield baseboards at a corner between two walls; and FIG. 6 is a cross sectional side view of the FIG. 3 shield means, taken at 6—6 in FIG. 3, illustrating the application of additional foot pressure to a shield for conforming the shield to a particularly irregular wall.

Detailed description

Referring to the drawings, a shield for protecting a baseboard includes a rigid, elongated member 10 suitably formed of wood, particleboard, fiberboard, chipboard, or the like. The member 10 is preferably flat, having a front side 12 and a rear side 14 defined between parallel lateral edges 16 and 18. Member 10 is provided with soft, resilient bumper means 20 disposed along the rear side 14 of the member adjacent edge 18. This soft, resilient bumper means suitably comprises an elastic foam material such as foam rubber or a foam plastic. The bumper means suitably comprises a strip of such foam material mounted on an adhesive layer of backing material 22 secured to the upper rear side of member 10. This strip normally has a substantially constant dimension X, perpendicular to the rear side, and therefore the foam strip 20 protrudes a substantially constant distance from rear side 14. In a particular instance, the soft, resilient bumper means 20 comprised a polyurethane foam sold under the trade name of TesaFoam.

While the shield is employed for protecting a baseboard, it is desirably provided with a skirt 24 of flexible material attached to said elongated member for forming a tarpaulin for covering a portion of the floor surface adjacent the covered baseboard. The skirt is suitably formed of canvas and is joined to the member 10 proximate the rear side 14 of said member for extending under edge 16 of the member when the shield is in use. The skirt is suitably secured to the lower portion of rear side 14 by means of tacks or staples 26.

In use, a first edge 16 of the shield according to the present invention rests upon a horizontal floor surface for supporting the member 10 in angular relation with respect to a wall. Referring, for example, to FIG. 6, a member 10 is disposed in angular relation against wall 28 with bumper means 20 engaging the wall surface above baseboard 30, the member 10 thereby functioning to protect the baseboard from liquid or semiliquid material as may be applied to the wall above member 10. The floor surface upon which member 10 rests suitably comprises a carpet layer 32 provided over the actual floor 34. Skirt 24 attached to member 10 protects the carpet from spatter of paint or the like. The skirt 24 frictionally engages the floor surface while bumper means 20 frictionally engages the wall, thereby tending to hold the member 10 in place so that it has little tendency to slide away from the wall.

The member 10 may make an angle with the floor surface varying between 45 degrees and 60 degrees or so, depending upon the height of baseboard 30. It is desirable that bumper means engage the wall above or in the vicinity of the top of baseboard 30, and the angular relation between the floor surface and the rear side of member 10 will accordingly vary. The aforementioned angular range is given by way of example only.

As member 10 leans against wall 28, bumper means 20 engages the wall and supports member 10 against the wall. The weight of member 10, directed towards the wall, compresses resilient bumper means 20 against the wall and causes the soft, resilient bumper means to conform to irregularities of the wall surface, substantially providing a seal between the bumper means and the wall. Almost any wall, although it may appear flat to the casual observer, will be found to have certain irregularities whereby the wall is other than perfectly planar. The bumper means according to the present invention readily follows these irregularities, whereas prior straight edge masking devices have failed to accurately match wall surfaces. Since the bumper means 20 substantially forms a seal between the bumper means and the wall, paint or other liquid material running or dripping down the wall will not pass bumper means 20, but will stop at this point whereby baseboard 30 is protected.

The weight of the member 10 causes bumper 20 to follow normal or even severe irregularities. For example, in FIG. 5 a member 10 includes a bumper means 20 conforming to the mortar joints in a brick wall 36 above baseboard 38. Furthermore, a second shield comprising a member 40 is provided with a bumper means 42 forming a shield along wall 44 above baseboard 46, such bumper means providing a seal around a telephone wire 48. However, in some cases the wall irregularities may be so extreme and diverse as to require additional pressure against the shield's elongated member. As illustrated in FIG. 6, this additional pressure is readily provided by resting the toe of one's shoe against the elongated member 10. Thus, a painter, while painting the wall, can, if necessary, easily exert the additional pressure against member 10.

Referring to FIG. 3, a set of shields desirably includes a first elongated member 10 attached to skirt 24 and provided with bumper means 20, as well as a second shield comprising an elongated member 40 provided with bumper means 42 and a skirt 54. Elongated member 40 desirably has a wider dimension Y between its parallel lateral edges than the similar dimension Z of member 10. In use, a member 10 is first propped against wall 28, covering baseboard 30 after which the shield comprising member 40 is extended substantially from the right end of member 10 in overlapping relation therewith. Since member 40 is wider than member 10, bumper means 42 is able to engage wall 28, and engages the wall just above bumper means 20. Member 10 may be approximately 40 inches long by 5½ inches wide, while member 40 is suitably 40 inches long by 6½ inches wide. As wall 28 is painted, the shield comprising member 10 may be moved to the right of member 40, after which member 40 is moved to the right of member 10, and so on, until the wall 28 has been painted.

Member 40 is substantially identical to member 10 except for its additional width and except for end edges thereof 60 and 62 which are straight but nonparallel to one another. These end edges angle upwardly and outwardly from lateral edge 64 towards lateral edge 66 making an angle between these lateral edges of between 60 degrees and 70 degrees, an angle of about 65 degrees being preferred. The purpose of the angular end edges is illustrated in FIG. 5 wherein end edge 62 of member 40 is positioned against the front side 12 of member 10, at the corner between walls 36 and 44. It is thus seen that angular end edge 62 conformally receives member 10 as the latter is angularly propped against wall 36. An angle of between 60 degrees and 70 degrees, and preferably an angle of approximately 65 degrees, has been found preferable for leaving the minimum amount of space between the end edge of one elongated member and the front surface of the other, while permitting an angle between member 10 and the floor surface of 45 degrees or so.

FIG. 4 illustrates a third shield comprising an elongated member 68 provided with a bumper means 70, and having skirt 72 attached thereto. Elongated member 68 is suitably shorter than elongated members 10 or 40, for example as viewed in FIG. 3, but otherwise has substantially the same dimension as member 10. Both member 68 and member 10 are provided with straight end edges perpendicular to the lateral side edges of the respective members. Member 68 may be used in conjunction with member 10 in overlapping relation when painting a baseboard between two upright members, as between two facing closet walls, with the straight end edge of one elongated member engaging one facing wall, while the opposite end edge of the remaining elongated member engages the opposite facing wall.

When paint is applied to a wall or ceiling over a shield according to the present invention, paint may drip or run down onto the bumper means associated therewith. Instead of this paint forming a hard, brittle surface on the bumper means, rather the bumper means is substantially self-cleaning, particularly in the case of the elastic foam embodiment. The resiliency and softness of the bumper means causes the paint to flake off as a powder after the paint dries on the bumper means, as a result of natural flexure of the bumper means. The bumper means is thereby renewed, and the ability of the bumper means to conform to irregularites is preserved as a result of the resiliency thereof. Thus, the shield according to the present invention can be continually reused without becoming nonusable because paint has fallen thereon.

It will, of course, be appreciated that the usefulness of the shield according to the present invention is not limited to protection of the baseboard against paint. The baseboard will suitably be protected against other liquid or semiliquid materials as may be applied to the wall or ceiling over the baseboard. Moreover, other objects in the nature of a baseboard or floor edge, i.e., the edge of a molding, shelf, mantel, or the like, may be similarly protected. The weight of the elongated member also greatly assists in holding the skirt or tarpaulin in place when the skirt or tarpaulin would otherwise tend to slip away from a surface to be painted.

Although a solid elongated member carrying a foam bumper means is preferred according to the present invention, the shield according to the present invention need not be formed of these particular materials in a broader sense. Thus, the shield according to the present invention may be provided in a throw-away version wherein the elongated member is formed of corrugated cardboard, with the resilient bumper means being formed of laminated tissue paper or the like. In such case, the skirt may be formed of heavy paper attached to the elongated member.

I claim:
1. A shield for protecting a baseboard when paint or a similar substance is applied to a wall thereabove comprising:
   an elongated member which is substantially rigid, having front and rear sides defined between parallel lateral edges, and wherein a first edge is adapted to rest upon a horizontal floor surface for supporting said member in angular relation against a wall with the said rear side of said member facing a baseboard at the base of said wall, said member functioning to protect said baseboard from liquid or semiliquid material applied to said wall above said member by providing a cover for said baseboard,
   said member being provided with resilient bumper means disposed along the rear side of said member adjacent the second edge thereof for engaging said wall and supporting said member against the wall, the weight of said member compressing said resilient bumper means against said wall for causing the bumper means to conform to irregularities of the wall surface and substantially providing a seal between said bumper means and said wall,
   wherein liquid or semiliquid material applied to said wall for adherence thereto is self-removing from said said bumper means because of the resiliency thereof for thereby preserving the ability of said bumper means to conform to wall irregularities.

2. The shield according to claim 1 wherein said bumper means comprises a strip of resilient material adhered to the rear side of said member adjacent the second edge thereof, said strip normally having a substantially constant dimension perpendicular to said rear side for protruding a substantially constant distance toward said wall along the length of said member.

3. The shield according to claim 2 wherein said resilient material is an elastic foam material.

4. The shield according to claim 1 further provided with a flexible skirt attached to said elongated member for forming a tarpaulin for covering a portion of said floor surface in conjunction with said elongated member.

5. The shield according to claim 4 wherein said skirt is joined to said member proximate the rear side of said member and extends under the first edge of said member and over said floor surface in order to provide a nonskid support for said member in conjunction with said bumper means, the friction of said bumper means against the wall and the skirt against the floor acting to enhance the positional stability of said member.

6. The shield according to claim 5 wherein said skirt comprises canvas joined to the rear side of said bumper means.

7. The shield according to claim 1 wherein said elongated member has first and second nonparallel ends, at least one of said ends being straight and angularly related to said parallel lateral edges at an angle of between 60 degrees and 70 degrees.

8. Shielding means for protecting a baseboard from paint or similar substances as applied to a wall surface thereabove comprising:
   first and second flat elongated members each of which is substantially rigid, having front and rear sides defined between parallel lateral edges, and wherein a first edge thereof is adapted to rest upon horizontal floor surface for supporting said member in angular engagement against a wall with the said rear side of said member facing a baseboard at the base of a wall,
   each said member including a resilient bumper means disposed along the rear side of said member adjacent the second edge thereof and extending against a wall, the weight of said member in angular engagement with the wall compressing said resilient bumper means against the wall for causing the bumper means to conform to irregularities of the wall surface to provide a seal between said bumper means and the wall surface,
   one said elongated member cooperating with the other elongated member and extending substantially from one end of the other elongated member to form an extension thereof for shielding additional baseboard area.

9. The shielding means according to claim 8 wherein the first said member is wider between the parallel lateral edges thereof for overlapping the said other member, with the bumper means of the said first member engaging a wall above the bumper means of the said other member.

10. The shielding means according to claim 8 wherein a first end of the first elongated member is provided with a straight edge angularly related to the parallel lateral edges of the same member for positioning against the front side of the first member at a corner between two walls, where one elongated member is angularly supported against one of the two walls and the other elongated member is angularly supported against the other of the two walls.

References Cited

UNITED STATES PATENTS

| 1,411,462 | 4/1922 | Wendt | 118—504 |
| 1,915,631 | 6/1933 | Truba et al. | 118—505 XR |
| 2,332,579 | 10/1943 | Kirby | 118—505 |
| 2,517,220 | 8/1950 | Lister | 118—504 |
| 2,698,003 | 12/1954 | Bullock | 118—504 |
| 2,820,312 | 1/1958 | Coontz | 118—505 XR |
| 3,029,782 | 4/1962 | Eure | 118—505 |

FOREIGN PATENTS 228,373  6/1960  Australia.

PETER FELDMAN, *Primary Examiner.*